US010576529B2

(12) United States Patent
Kalyani et al.

(10) Patent No.: US 10,576,529 B2
(45) Date of Patent: Mar. 3, 2020

(54) OPEN DIE FORGING PROCESS FOR MINIMIZING END LOSSES AND A PRODUCT MADE USING IT

(71) Applicants: Bharat Forge Limited, Mundhwa Pune Maharashtra (IN); Babasaheb Neelkanth Kalyani, Mundhwa Pune Maharashtra (IN); Shreyans Subhash Khot, Mundhwa Pune Maharashtra (IN); Madan Umakant Takale, Mundhwa Pune Maharashtra (IN); Valmik Vitthal Bhavar, Mundhwa Pune Maharashtra (IN); Manoj Rajendra Ukhande, Mundhwa Pune Maharashtra (IN)

(72) Inventors: Babasaheb Neelkanth Kalyani, Mundhwa Pune Maharashtra (IN); Shreyans Subhash Khot, Mundhwa Pune Maharashtra (IN); Madan Umakant Takale, Mundhwa Pune Maharashtra (IN); Valmik Vitthal Bhavar, Mundhwa Pune Maharashtra (IN); Manoj Rajendra Ukhande, Mundhwa Pune Maharashtra (IN)

(73) Assignee: Bharat Forge Limited (IN)

( * ) Notice: Subject to any disclaimer, the term of this patent is extended or adjusted under 35 U.S.C. 154(b) by 54 days.

(21) Appl. No.: 15/511,150

(22) PCT Filed: Aug. 14, 2015

(86) PCT No.: PCT/IB2015/056202
§ 371 (c)(1),
(2) Date: Mar. 14, 2017

(87) PCT Pub. No.: WO2016/027210
PCT Pub. Date: Feb. 25, 2016

(65) Prior Publication Data
US 2017/0266715 A1    Sep. 21, 2017

(30) Foreign Application Priority Data

Aug. 18, 2014   (IN) .......................... 2633/MUM/2014

(51) Int. Cl.
*B21J 1/00*       (2006.01)
*B21J 1/02*       (2006.01)
(Continued)

(52) U.S. Cl.
CPC ................. *B21J 1/02* (2013.01); *B21J 5/022* (2013.01); *B21J 5/08* (2013.01); *B21J 5/12* (2013.01);
(Continued)

(58) Field of Classification Search
CPC ....... B21J 1/02; B21J 5/022; B21J 5/08; B21J 5/12; B21K 1/20; B21K 1/24
See application file for complete search history.

(56) References Cited

FOREIGN PATENT DOCUMENTS

| EP | 1145777 A1 | 10/2001 | |
|----|-----------|---------|---|
| JP | 53142350 A | * 12/1978 | ............. B21B 1/024 |
| JP | S579502 A1 | 1/1982 | |

OTHER PUBLICATIONS

International Search Report for PCT/IB2015/056202 dated Nov. 20, 2015.
(Continued)

*Primary Examiner* — Debra M Sullivan
(74) *Attorney, Agent, or Firm* — Andrus Intellectual Property Law, LLP

(57) ABSTRACT

The invention discloses a process of manufacturing heavy and critical components such as a blowout preventer (BOP) with a combination of open die forging, piercing and machining process which results in to better material utilization and saving in the machining time. The forging process of the invention involves a step of notching, wherein a (Continued)

transverse notch is made near each end of the ingot before cogging said ingot. The invention allows development of safety and critical components with effective material utilisation.

8 Claims, 5 Drawing Sheets

(51) Int. Cl.
      *B21J 5/12*       (2006.01)
      *B21K 3/00*       (2006.01)
      *B21J 5/02*       (2006.01)
      *B21J 5/08*       (2006.01)
      *B21K 1/20*       (2006.01)
      *F16K 27/04*       (2006.01)

(52) U.S. Cl.
      CPC .................. *B21K 1/20* (2013.01); *B21K 3/00* (2013.01); *F16K 27/044* (2013.01)

(56) References Cited

OTHER PUBLICATIONS

Written Opinion for PCT/IB2015/056202 dated Nov. 20, 2015.
International Preliminary Report on Patentability for PCT/IB2015/056202 dated Feb. 21, 2017.

\* cited by examiner

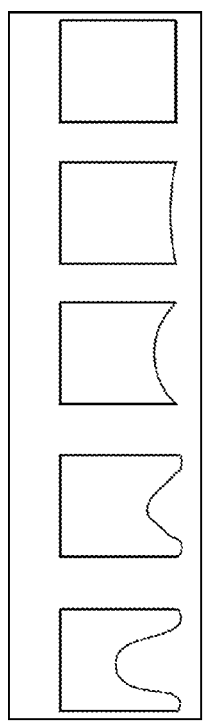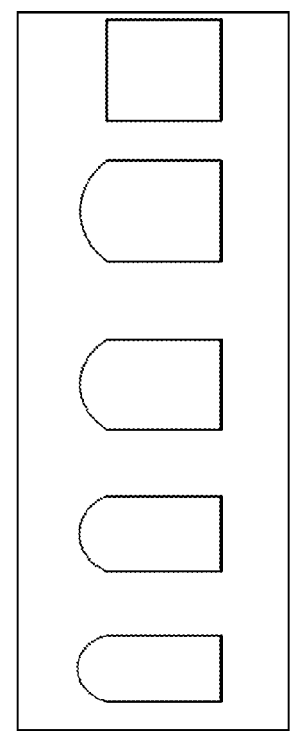
Figure 4
(PRIOR ART)
Figure 5

OPEN DIE FORGING PROCESS FOR MINIMIZING END LOSSES AND A PRODUCT MADE USING IT

CROSS-REFERENCE TO RELATED APPLICATIONS

The present application is the U.S. national stage of International Application PCT/IB2015/056202, filed on Aug. 14, 2015, which international application was published on Feb. 25, 2016 as International Publication No. WO 2016/027210. The International Application claims priority to Indian Application No. 2633/MUM/2014, filed on filed on Aug. 18, 2014, the contents of which are incorporated herein by reference in their entireties.

FIELD OF INVENTION

The present invention relates to blowout preventers (BOPs) which are conventionally used in hydrocarbon recovery operations to prevent well blowouts. More particularly, this invention relates to forging process which uses raw materials, forging equipment and other available resources more effectively and bring about improvement to the quality, mechanical properties and safety operation of the BOP.

BACKGROUND OF INVENTION

For many decades, critical components such as BOPs have been manufactured using open die forging technique followed by a substantial machining operation.

With traditional open die manufacturing process (ingot-pin forming and saddling, upsetting, drawing, and forging to size) such large and critical components are manufactured with a material yield of approximately 40% to 45%. Broad steps involved in a typical existing forging method for manufacture of such parts are:
Ingot cogged into bloom→saw cutting→rough sizing→rough machining→heat treatment→semi finish machining→finish machining As shown in FIG. 2, these involve drawing the fluted ingot, upsetting, cogging and cutting it in 2 pieces, followed by machining, heat-treating and finish-machining.

The above process entails achieving a rough forging shape by the open die forging process while final shape and dimensions are achieved through the machining. In a nutshell, the existing manufacturing method is the combination of open die forging, machining and heat treatment. It has been the applicant's experience that the existing process results in about 42% utilization of material (or about 58% wastage of material) over the entire process: right from cogged bloom to finished part.

One of the key issues observed in adopting conventional open die forging methods to forge large components such as a BOP is fish-tail forming as illustrated in FIG. 4. At the end of a cogging step, an ingot with rectangular end configuration is obtained. When the rectangular end shape is forged using an open die method, the material at the periphery starts to move ahead of the material near the centre, thus forming a fish tail at end shape of cogged billet.

In an open die forging process for manufacturing large and critical component such as a BOP, there are no existing processes which allow forming near net shapes (and thereby reduce the extent of machining). Hence there is a need to develop an open die forging process to make complex, large and critical components which will result into reduction in input material, machining operations along with cycle time, energy consumption and ultimately in the manufacturing cost.

It is evident from FIG. 2, during mass production of such components using conventional forging methods, substantial raw material is wasted with conventional manufacturing method which results into large machining time and poor yield (42%). In order to reduce such wastage, it is important to have near-net shape input to machining. This would help establish right balance between forging and machining processes and effectively utilize material and machining time. The components such as a BOP would thus be manufactured with improved productivity without compromising the desired mechanical properties and specific strength.

There have been a number of inventions made in the field of BOPs. Some of these are listed below.

U.S. Pat. No. 8,136,247 includes forming a first billet to form a first portion of the blowout preventer body; forming a second billet to form a second portion of the blowout preventer body; and welding the billets to form the blowout preventer body.

The invention of U.S. Pat. No. 6,318,482 relates to a BOP permitting a certain degree of controlled fluid leakage to the annulus above the packer, whereby drilling mud may be caused to fill up the entire borehole in an emergency situation associated with a dangerous blowout from the subsea well. It is thus clear that Occurrence of an uncontrolled blowout of fluid (liquid and/or gas) in a subsea well, the blowout preventer is released in a manner to adopt an activated or set position stopping the blowout.

U.S. Pat. No. 5,897,094 the present invention relates to blowout preventers (BOPs) which are conventionally used in hydrocarbon recovery operations to prevent well blowouts. More particularly, this invention relates to the BOP with an improved mechanism for structurally interconnecting the BOP body and each of the pair of radially opposing doors which support the ram assemblies, and for structurally disconnecting the doors from the BOP body during ram block service operations.

U.S. Pat. No. 2,284,869 relates to blowout preventers for casing Heads of general type with previous U.S. Pat. No. 19,047 entitled 'Casing head with blowout preventer" & as one of its principle objective is provision of a relatively simple and inexpensive but nevertheless extremely effective blowout preventer.

U.S. Pat. No. 3,647,174 invention relates to blowout preventers of ram type having piston and cylinder means for normal opening and closing of the rams and for also effecting movements of the preventer bonnet away from and back to body when bonnet is disconnected from body.

U.S. Pat. No. 4,044,988 invention relates to blowout ram preventer comprising housing with a longitudinal cavity and a transverse bore. Rams arranged in the cavity of housing to reciprocate relative to bore. The transverse spacing between longitudinal guides at walls of the cavity is uniformly reduced in direction from ends of housing to the bore, the ram packer being reinforced from the bore side with radial metal members while the body of ram is comprised of a plurality of member adapted to move relative to one another during ram movement.

U.S. Pat. No. 4,227,543 invention relates to an improved blowout preventer having a secondary sealing system which can be used to stop leaking through the packing, also providing secondary sealing capability available whenever there is a leak.

U.S. Pat. No. 4,253,638 invention relates to an improved blowout preventer in which the bonnets are pivotally mounted to the body and are secured by a throw-type latch. The hinges and latches are made adjustable so that the bonnet sets properly on the body in closed position.

U.S. Pat. No. 4,526,339 the present invention is directed to blowout preventer of the cross ram type where first and second pairs of rams on the same plane provide for flexibility. The invention is particularly used in the drilling of oil and gas wells and related services; i.e., snubbing and work over.

U.S. Pat. No. 4,844,406 this invention relates to well tools, and to a device for installation on the tubing head at the top of a well to confine pressure in the well, and more commonly known as blowout preventer. The blowout preventer of the invention is constructed to provide a seal at upper end of a well about a tubing string, a polished rod, a wire line, and to close off the bore through the well head in the absence of any of the members extending through the wellhead.

It is evident that none of these deal with the problem of raw material wastage during the manufacturing process or with improving the component quality. There is therefore a need to provide a manufacturing process for large and critical components such as BOPs which achieves effective material utilisation. In particular there's a need to provide a manufacturing process with combination of open die forging or close die forging and machining. Furthermore, the industry finds a need for a manufacturing process that would achieve a near-net shape before carrying out finished machining.

OBJECTS OF INVENTION

Accordingly an object of the invention is to develop safety and critical components with effective material utilisation.

Further object of the invention is to provide method of manufacturing the same.

Another object is to design manufacturing process of blowout preventer with combination of open die forging, piercing and machining.

Another object is to reduce amount of machining and develop forging process on both ends of cogged bloom to achieve required shape and size.

Another object is to provide forging die design to introduce notching operation. Yet another object is to form a dumbbell shape and elimination of fish tail formation at the ends by introducing a notching operation.

Another object is to reduce machining operation so as to enhance material utilisation during forging process by introducing piercing process.

These and other objectives will become more apparent from the following description in which reference is made to the appended drawings. The drawings accompanying the specification are for the purpose of illustration only and are not intended to be in any way limiting.

SUMMARY OF INVENTION

The invention discloses a process of manufacturing heavy and critical components such as BOP with a combination of open die forging, piercing and machining process which results in to better material utilization and saving in the machining time.

BRIEF DESCRIPTION OF DRAWINGS

FIG. 4 shows fishtail formation at end of cogged bloom. In conventional manufacturing process with successive incremental forming of end corner it results into fishtail formation. Figure shows defective end shape.

FIG. 5 shows convex shape formation at end of cogged bloom. Effect of inventive manufacturing process reduces end defects.

DETAILED DESCRIPTION OF INVENTION

Figure 1:
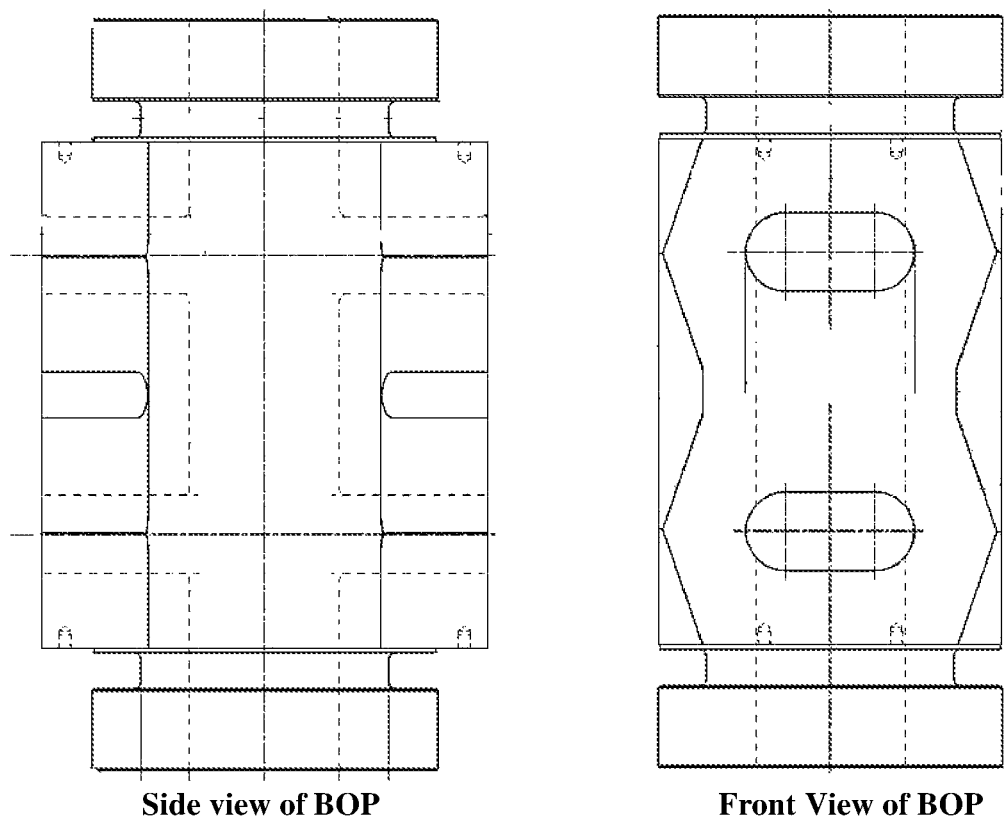
FIG. 1 shows Blow out preventer. Here final machined component's front view and side view are shown.

The invention discloses a process of manufacturing a large and complex forged part. In particular, the invention also discloses a process of manufacturing the blowout preventer (see FIG. 1) which is used in oil and gas industry.

During a typical manufacturing process involving forging of such large and complex parts (see FIG. 2) there is a stage of forming in which the part to be forged is pressed at the ends while being rotated. During the forming process, when the end corners of a cogged ingot/billet are pressed, the outer side material flows to a greater extent than the material near the core of the section. This leads to the formation of a fishtail at end corners (see FIG. 4). Formation of fishtails at ends of billets during cogging process not only reduces the yield of the process but it also deteriorates the quality of the forged components.

Figure 6:
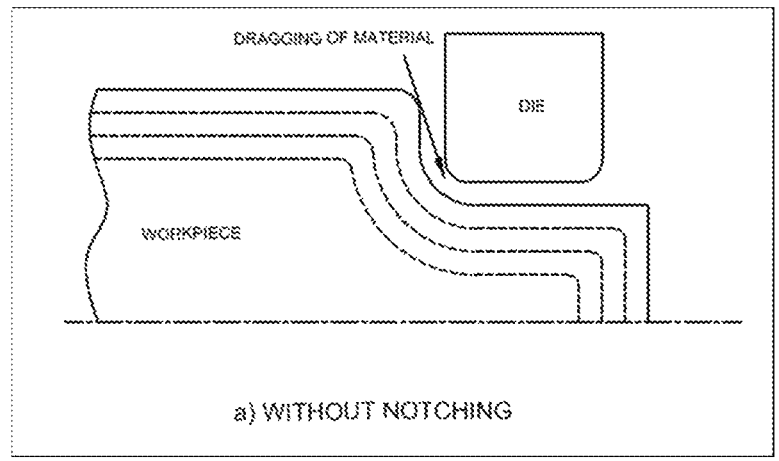
FIGS. 6 and 7 show the grain flow lines for the forging processes with and without notching operation-respectively.
Figure 7:
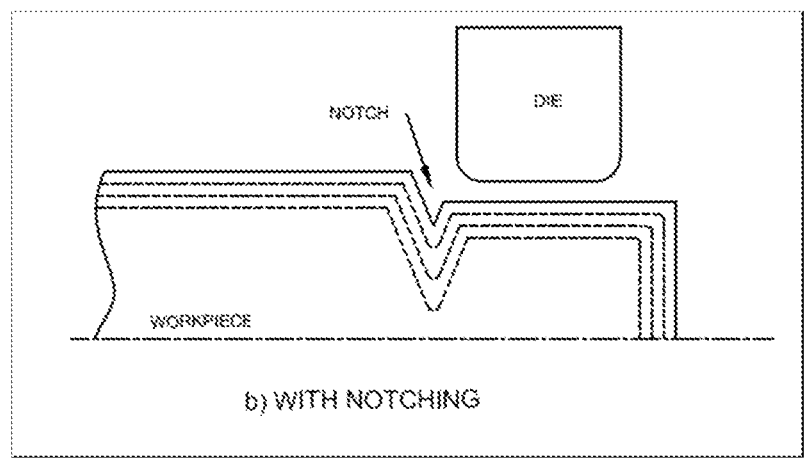

In one aspect of the invention, the process of cogging is carried out without formation of fishtails at the ends. This is achieved by forming notches near the ends of the cogged billet (see FIG. 3). Notches play an important role in controlling the flow pattern of a forged part. They help to flow the material in a narrow path, as flow lines are divided in notch region. (see FIGS. 6 and 7). This avoids dragging of part (or its material) near its ends as flow lines of material are separated by the notching operation. Rather, as the flow lines are cut and divided, the material movement of the core of billet will take place thereby forming a bulge at the end of billet (see FIG. 5) rather than a fishtail.

Optimization of a forging process is highly desirable in saving material during a manufacturing process. A key aspect of such optimization is to invent a process in which the initial volume of material used for the product is very close to the final volume of the product. The present invention discloses an optimized forging process for BOPs by using open die forging technique with a particular emphasis on minimizing the machining resources and initial ingot weight.

The material flow behavior at centre region as well as surface region of cogged billet studied and analyzed using 3D metal flow simulation software.

Figure 2:
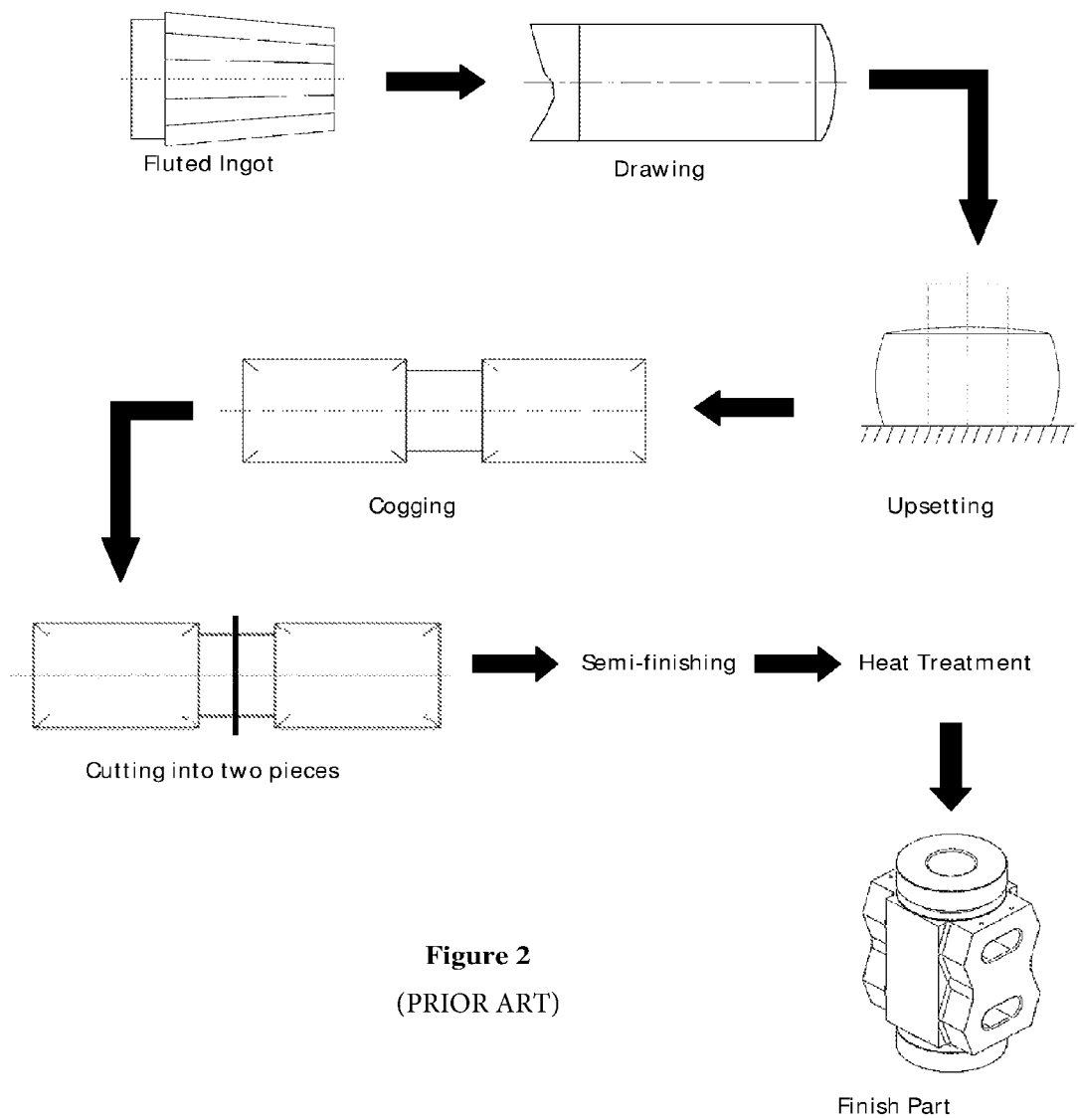
FIG. 2 shows the conventional component manufacturing method. Here sequence of operation shows drawing the fluted ingot, upsetting, cogging operation and cutting in to 2 pieces followed by machining, heat-treatment and finish-machining

Conventional manufacturing process of a large and complex part such as a BOP is shown in FIG. 2. Using Finite Element Analysis, optimized process design has been proposed so as to forge the complex component with minimal quantity of material.

Based on simulation results, the inventors have found an optimal manufacturing methodology for a large and complex part such as a BOP. This involves adding stages of notching and piercing in between the open die forging and machining stages of the process.

Figure 3:
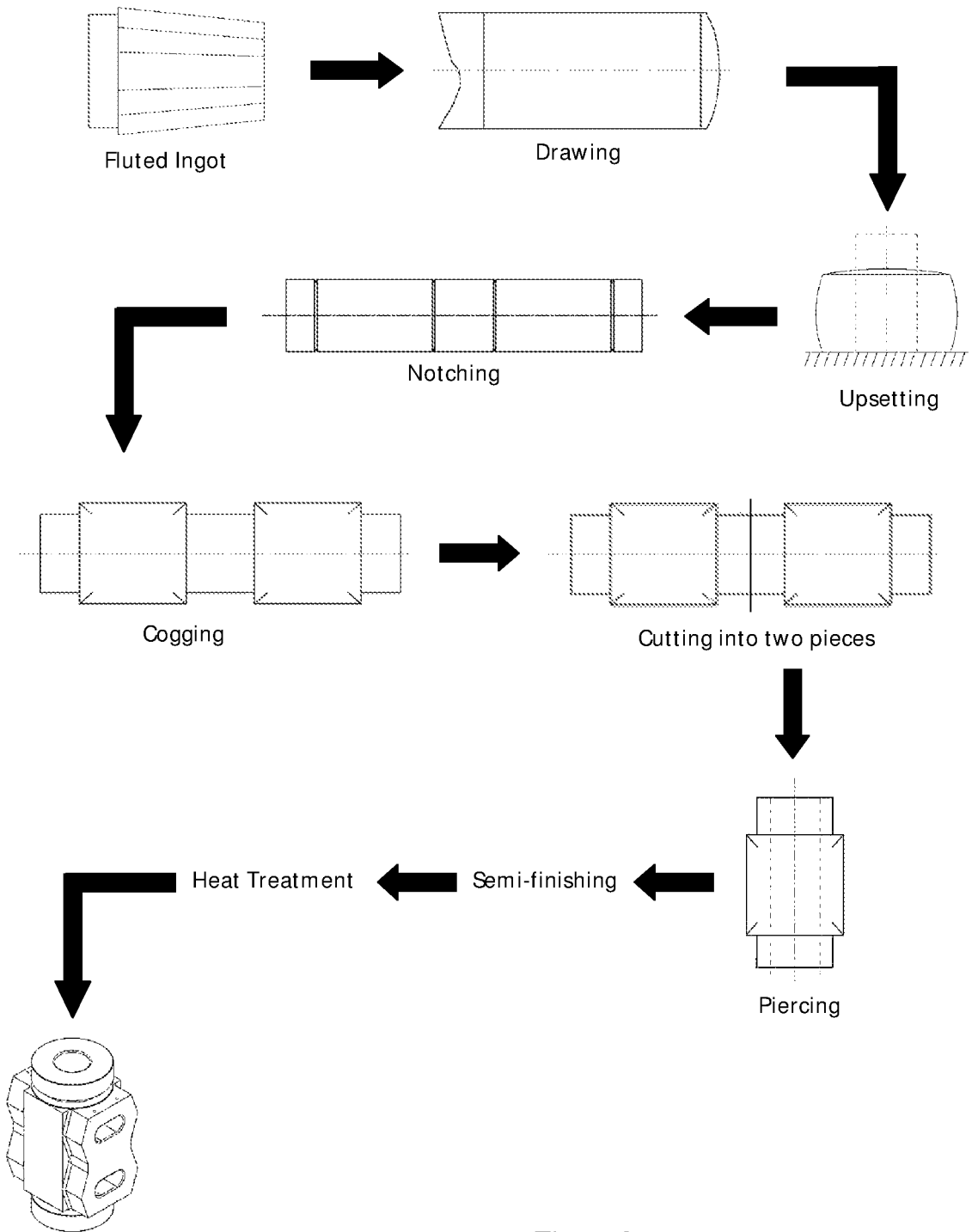
FIG. 3 shows the invented component manufacturing process. In invented manufacturing process sequence is modified as drawing the fluted ingot, upsetting, notching and cogging at end corners followed by cutting into two parts, piercing hole, semi finishing, heat-treatment and finish—machining.

The process of the invention starts with a fluted ingot which is drawn into a desired shape after which it is subjected to upsetting and cogging to bring it into a desired shape. This shaped component is next cut into two pieces as shown in FIG. 3. Each piece is next subjected to a piercing operation. This is followed by machining to obtain final shape which is subjected to heat treatment followed by finished machining process.

Piercing operation is found particularly useful for large forged parts such as a blow-out preventer that is used in oil exploration industry. Piercing rather than machining creates favourable grain flow lines and a much stronger final part.

It is evident from the foregoing discussion that the present invention has the following embodiments:
 1. An open die forging process for minimizing end losses characterised in that said forging process involves a step of notching, wherein a transverse notch is made near each end of the ingot before cogging said ingot.
 2. An open die forging process as disclosed in embodiment 1, characterised in that said process comprises the steps of forming a fluted ingot, drawing the ingot and upsetting it, before forming said notches at said ends of said upset ingot.
 3. An open die forging process as disclosed in embodiments 1 and 2, characterised in that said process further comprises the steps of cogging and cutting into two pieces for further processing such as piercing said pieces, semi machining and machining to final products.
 4. A product made using open die forging method as disclosed in any of the embodiments 1 to 3.

While the above description contains much specificity, these should not be construed as limitation in the scope of the invention, but rather as an exemplification of the preferred embodiments thereof. It must be realized that modifications and variations are possible based on the disclosure given above without departing from the spirit and scope of the invention. Accordingly, the scope of the invention should be determined not by the embodiments illustrated, but by the appended claims and their legal equivalents.

The invention claimed is:

1. An open die forging process for preparing a finished part from an ingot having end edges defining an elongated dimension of the ingot, the open die forging process comprising (i) prior to cogging, notching the ingot at each end of the ingot, interior of the end edges with notches having an angular V-shaped profile, the notches extending across the ingot transverse to the elongated dimension; (ii) cogging the ingot from the end edges to positions adjacent to the notches formed in step (i), the notches transverse to a direction of travel of the ingot during the cogging; and (iii) further processing the cogged ingot to obtain the finished part, wherein the notching minimizes end losses in the open die forging process.

2. The open die forging process as claimed in claim 1, characterised in that the ingot is a fluted ingot and the open die forging process further comprises prior to step (i) the steps of forming the fluted ingot, drawing the fluted ingot, and upsetting the fluted ingot.

3. The open die forging process as claimed in claim 2, characterised in that the further processing of step (iii) comprises the step of cutting the ingot into two pieces.

4. The open die forging process as claimed in claim 3, characterised in that the further processing of step (iii) further comprises piercing the two pieces, semi-machining the two pieces, and machining the two pieces to obtain finished parts.

5. The open die forging process as claimed in claim 1, characterised in that the further processing of step (iii) comprises the step of cutting the ingot into two pieces.

6. The open die forging process as claimed in claim 5, characterised in that the further processing of step (iii) further comprises piercing the two pieces, semi-machining the two pieces, and machining the two pieces to obtain finished parts.

7. The open die forging process as claimed in claim 5, further comprising:
 notching the ingot with notches having the angular V-shaped profile and extending across the ingot transverse to the elongated dimension at positions internal to the ingot on opposite sides of a location of the cutting of the ingot into two pieces; and
 cogging the ingot across the location of the cutting of the ingot into two pieces and between the notches at positions internal to the ingot.

8. The open die forging process as claimed in claim 1, further comprising:
 notching the ingot with notches having the angular V-shaped profile and extending across the ingot transverse to the elongated dimension at positions internal to the ingot; and
 cogging the ingot between the notches at positions internal to the ingot.

* * * * *